United States Patent

Zimmer et al.

Patent Number: 5,117,744
Date of Patent: Jun. 2, 1992

[54] SENSOR FOR AN AIR-CONDITIONING SYSTEM IN A VEHICLE

[75] Inventors: Claes Zimmer; Lars Johnsson; Anders Knutson, all of Trollhättan, Sweden

[73] Assignee: Saab Automobile Aktiebolag, Sweden

[21] Appl. No.: 689,896

[22] PCT Filed: Dec. 20, 1989

[86] PCT No.: PCT/SE89/00737
§ 371 Date: Jun. 14, 1991
§ 102(e) Date: Jun. 14, 1991

[87] PCT Pub. No.: WO90/07102
PCT Pub. Date: Jun. 28, 1990

[30] Foreign Application Priority Data

Dec. 22, 1988 [SE] Sweden .............. 8804623

[51] Int. Cl.⁵ .............................. G01J 1/20
[52] U.S. Cl. .................. 454/75; 236/91 C; 250/203.4; 454/156; 454/900
[58] Field of Search .......... 126/425; 236/91 C; 165/43; 98/2.01; 250/203.4

[56] References Cited

U.S. PATENT DOCUMENTS 4,890,460 1/1990 Takasi et al. .............. 126/425 X

FOREIGN PATENT DOCUMENTS 0133914 8/1983 Japan .................. 236/91 C
1567419 5/1980 United Kingdom .......... 250/203.4

Primary Examiner—William E. Wayner
Attorney, Agent, or Firm—Ostrolenk, Faber, Gerb & Soffen

[57] ABSTRACT

A sensor for an air-conditioning system in a vehicle has a measuring head with a number of solar cells arranged in a defined pattern for determining the intensity of the solar radiation and the position of the sun relative to the sensor. Attachment elements on the sensor permit assembly of the sensor only in one way in the vehicle. A dome over the solar cells is transparent only to solar radiation.

19 Claims, 2 Drawing Sheets

SENSOR FOR AN AIR-CONDITIONING SYSTEM IN A VEHICLE

The present invention relates to a sensor for an air-conditioning system in a vehicle, for controlling the air-conditioning system as a function of solar radiation, and provided with a measuring head arranged under a dome transparent to solar radiation, and with elements for connection to a control unit included in the air-conditioning system.

It is becoming more and more common for modern cars to be provided with an air-conditioning system which automatically maintains a desired cabin temperature independently of external climatic conditions. As a function of, on the one hand, adjustments made on a control panel and, on the other hand, signals from sensors, for example for outside air temperature, solar radiation, air mixture temperature after heat exchangers and cabin air temperature, it is thus possible for an air-conditioning control unit to control the fan speed and the setting of different valves which regulate the air flow in the cabin. The solar radiation has hitherto been recorded by means of a photodiode which has been able to control the speed of the cabin fan. However, it has been found that this regulation is not satisfactory.

The aim of the invention is to permit improved sensing of the solar radiation in order to thereby achieve better and more reliable regulation of the temperature in the vehicle cabin.

This is achieved according to the invention by virtue of the fact that the measuring head has a number of solar cells arranged in a defined pattern for determining the intensity of the solar radiation and the position of the sun both in terms of the altitude angle and the azimuth angle, that at least a first solar cell is arranged on an upper, plane surface which is oriented in such a way that it is essentially horizontal when the sensor is mounted in the vehicle, and by virtue of the fact that the sensor has attachment elements which permit assembly of the sensor only in one way in the vehicle, as a result of which the air-conditioning system can be controlled as a function of the intensity of the solar radiation and the position of the sun relative to the vehicle.

Since the shape of the vehicle affects the degree of incident solar radiation in the vehicle at different positions of the sun relative to the vehicle, it is thus possible also to adapt the air-conditioning control to the design of the vehicle. This is of great importance in today's types of vehicles, in which the vehicle windows are often large and greatly inclined.

The measuring head of the sensor can be designed in a number of different ways, but according to a particularly advantageous embodiment the measuring head has four side surfaces at right angles to the upper plane surface, which side surfaces are parallel in pairs and form right angles to the two other side surfaces, in which respect there is a solar cell on each one of these side surfaces, and the side surfaces in one pair are arranged so that, in the assembled position of the sensor, they are parallel to the longitudinal direction of the vehicle. This permits a compact and simple design of the measuring head.

According to another variant, on the upper, plane surface of the measuring head there can be four solar cells, which have corners meeting each other, and a shadow element, which produces a shadow image across the solar cells, which image varies with the position of the sun relative to the sensor.

The invention is illustrated in greater detail below with reference to exemplary embodiments shown on the attached drawing, in which.

Figure 6:
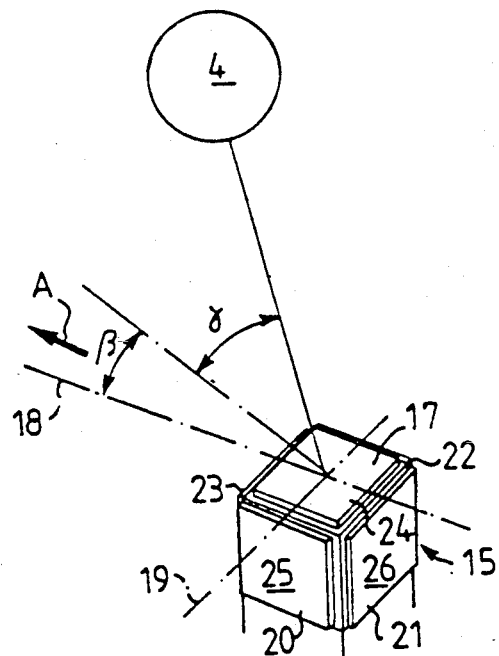
Figure 9:
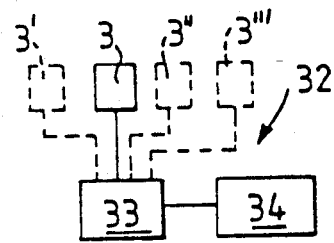
Figure 7:
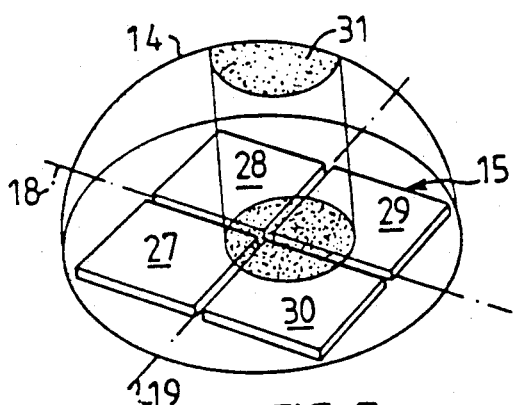
Figure 8:
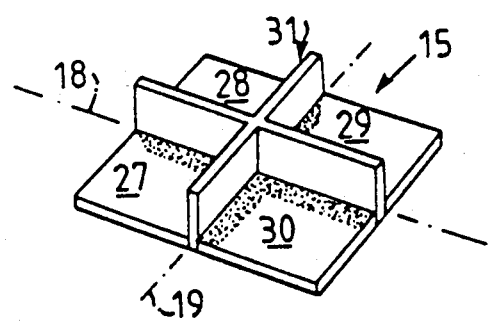

FIG. 6 shows the orientation of the sun relative to a measuring head in a sensor according to the invention, FIG. 7 shows a variant of a measuring head in a sensor according to the invention, FIG. 8 shows yet another variant of a measuring head in a sensor according to the invention, and FIG. 9 shows in principle how a sensor according to the invention is coupled to an automatic air-conditioning system in a vehicle.

Figure 1:
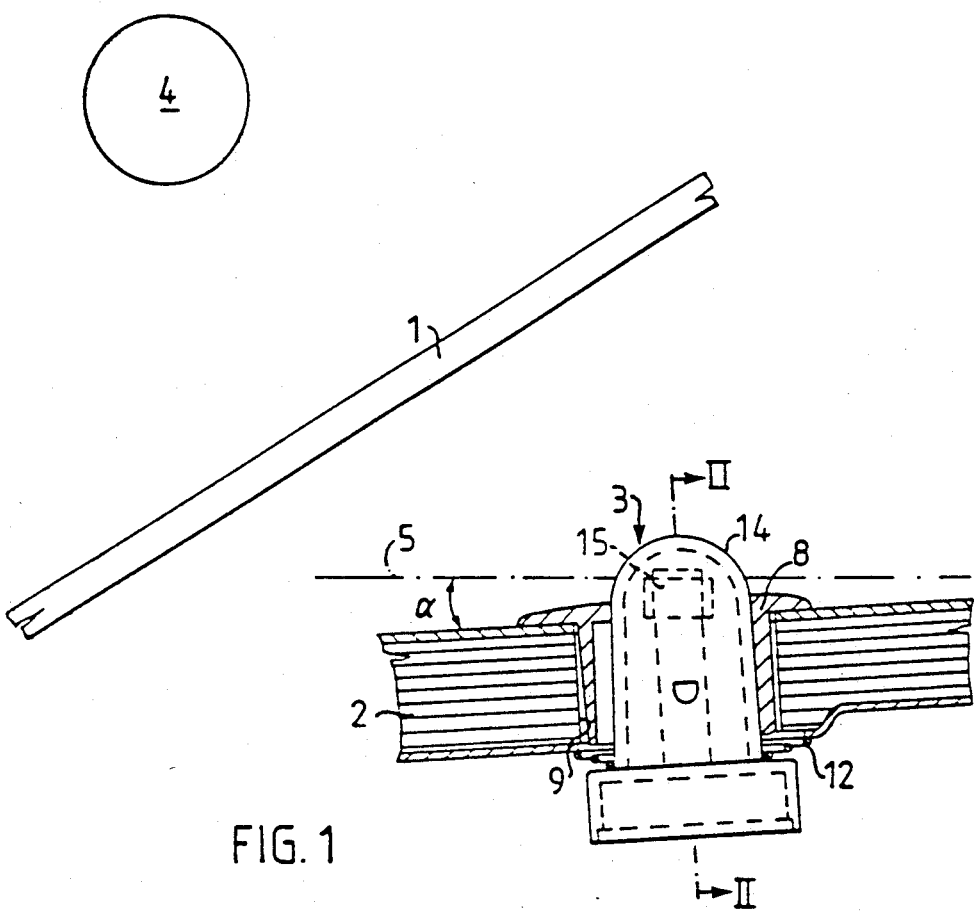
FIG. 1 shows a sensor according to the invention mounted in a vehicle.
Figure 2:
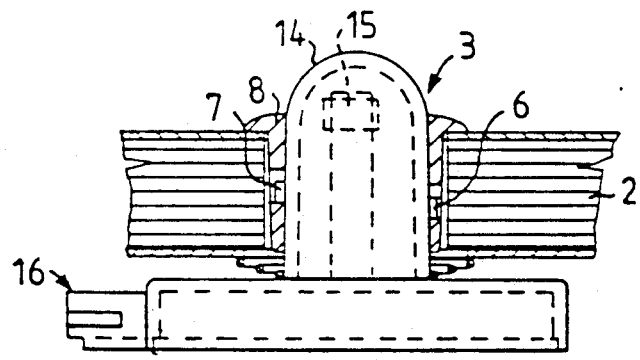
FIG. 2 shows a section II—II in FIG. 1.
Figure 3:
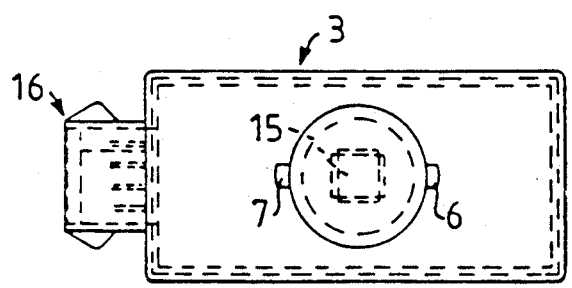
FIG. 3 shows the sensor in FIGS. 1 and 2 seen from above.
Figure 4:
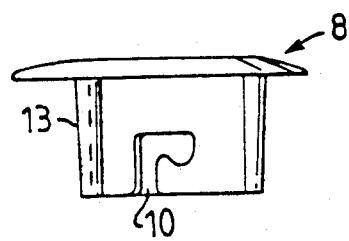
FIG. 4 shows a side view of a holder for the sensor according to the invention.
Figure 5:
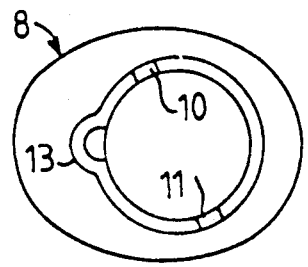
FIG. 5 shows the holder in FIG. 4 seen from below.

In an air-conditioning system for the cabin of a motor vehicle according to FIG. 1, a sensor 3 is mounted behind the windscreen 1 of the vehicle, in the upper, essentially horizontal part 2 of the instrument panel. By means of this sensor, the air-conditioning system can be controlled as a function of, on the one hand, the intensity of the heat radiation from the sun 4 and, on the other hand, the position of the sun relative to the vehicle. As can be seen, in the example shown the upper part 2 of the instrument panel slopes slightly forwards (angle α) relative to the horizontal plane 5.

By means of attachment elements in the form of locking pins 6 and 7, the sensor 3 is in engagement with a holder 8 which is fitted from above in an opening 9 in the upper part 2 of the instrument panel. The locking pins 6 and 7, which are at different heights, cooperate respectively with locking grooves 10 and 11 in the holder 8, by means of which a bayonet locking of the sensor 3 is achieved. The design of the locking grooves 10, 11 and of the locking pins 6, 7 means that the sensor 3 can be mounted only in one way in the vehicle, which ensures that it is always oriented correctly relative to the vehicle. The importance of this will become apparent hereinbelow. A spring 12 holds the sensor 3 fixed in the locked position in the holder 8 and, thus, in the vehicle.

The holder 8 is in turn provided with a fixation element which locks it in the correct turning position relative to the upper part 2 of the instrument panel. In this particular case the fixation element consists of a radial projection 13 on the part of the holder 8 sticking down in the opening 9. This projection 13 fits in a corresponding recess in the upper part 2.

At the top the sensor 3 is provided with a dome 14 which sticks up out of the holder 8 and which is transparent to the heat radiation from the sun and can be suitably made of, for example, coloured acrylic plastic. In this respect it is advantageous if the colouring is such that only heat radiation from the sun is transmitted through to a measuring head 15 which is arranged under the dome 14 and which can be connected electrically, via a connection element 16 arranged underneath on the sensor 3, to a control unit included in the air-conditioning system.

The measuring head 15 can be designed in a number of different ways, for example according to what is shown in FIGS. 6-8. In all these embodiments the measuring head 15 has an upper, plane surface 17 which is oriented in such a way that it is essentially in a horizontal plane 5 when the sensor 3 is mounted in the vehicle (FIG. 1). In FIG. 6 the two orthogonal axes 18 and 19 are situated in the plane of the surface 17, in which respect the axis 18 is intended to be parallel with the longitudinal direction of the vehicle. The normal driving direction of the vehicle is indicated by the arrow A. The position of the sun 4 relative to the measuring head 15 and the axes 18, 19 can be defined by means of the azimuth angle $\beta$ and the altitude angle $\gamma$.

According to FIG. 6 the measuring head 15 has four side surfaces 20-23 at right angles to the upper plane surface 17, the side surfaces 20 and 22 being parallel to the axis 18, while the side surfaces 21 and 23 are parallel to the axis 19. On each one of the five surfaces 17 and 20-23 there is mounted a solar cell, of which only the solar cell 24 mounted on the upper plane surface 17 and the solar cells 25 and 26 mounted on the side surfaces 20 and 21, respectively, are indicated here. By means of comparing signals from the different solar cells in a microprocessor, it is possible to determine the position of the sun 4 and, in addition, the intensity of the solar radiation. Taking these values as a starting point, and on the basis of previously determined table values, the incident heat radiation to the cabin can be determined in order to obtain appropriate control of the climatic condition in the vehicle.

A different design of the measuring head 15 is shown in FIGS. 7 and 8. In both cases, four solar cells 27-30 have been arranged on the upper, plane surface 17, which solar cells 27-30 are arranged one in each of the four quadrants which are formed by the axes 18 and 19, with corners meeting each other where these axes intersect each other. In the embodiment according to FIG. 7 there is a shadow element 31 in the form of a non-transparent surface area arranged on the dome 14. In this way a shadow image varying with the position of the sun is obtained across the solar cells. The position of the sun can be determined by comparison between the signals of the solar cells.

In FIG. 8 the shadow element 31 instead consists of vertical walls which are arranged between the solar cells 27-30 and which produce a shadow image across the solar cells, which image varies with the position of the sun.

The basic construction of an automatic air-conditioning system 32 is shown in FIG. 9. A sensor 3 designed according to the invention is connected to a control unit 33 included in the air-conditioning system 32, which control unit 33 in turn controls the air-conditioning system's heating system 34 which includes, for example, fan, various temperature valves, air-distribution valves, compressor etc. Further sensors 3′, 3″, 3‴ are suitably coupled to the control unit 33 for outside air temperature, cabin air temperature and air mixture temperature. In addition, there are of course elements for setting the desired climatic condition (not shown).

The sensor 3 can advantageously comprise an amplifier and a microprocessor for treating the signals received from the solar cells.

The embodiments described above can of course be varied further within the scope of the invention, for example by changing the number of solar cells and their position. One possibility is, for example, to let one corner of the measuring head be directed forwards.

We claim:

1. A sensor for an air-conditioning system and a control unit operated by the sensor all in a vehicle for controlling the air-conditioning system as a function of the solar radiation, the vehicle including a window; the sensor comprising:
   a measuring head inside the vehicle behind the window, the measuring head having a plurality of solar cells arranged in a defined pattern;
   a dome over the measuring head and covering the solar cells, the dome being transparent only to heat radiation from the sun; and each solar cell being positioned for receiving radiation through the dome, the solar cells being arrayed for determining the intensity of the radiation and the position of the sun with respect to the measuring head in terms of the altitude angle and the azimuth angle;
   the measuring head having an upper surface, at least a first one of the solar cells being arranged on the upper surface of the measuring head, the first solar cell being oriented such that it is essentially horizontal, with the sensor mounted on the vehicle;
   attachment elements on the sensor for attachment of the sensor to the vehicle only at a predetermined orientation behind the window in the vehicle so that the solar cells can determine the altitude angle and azimuth angle of the sun;
   the control unit for controlling operation of the air conditioning system being dependent upon the measured radiation on the solar cells, and means connected between the solar cells and the control unit for communicating a signal responsive to the detected radiation to the control unit.

2. The sensor of claim 1, wherein the vehicle window is its windscreen and the sensor is mountable behind the windscreen of the vehicle.

3. The sensor of claim 2, wherein the vehicle includes an instrument panel behind the windscreen, the instrument panel having an upper part below the windscreen, and the sensor attachment elements being adapted for attaching the measuring head and dome at the upper part of the instrument panel in the vehicle.

4. The sensor of claim 3, wherein the attachment elements of the sensor comprise bayonet locking means on the sensor and cooperating bayonet locking and receiving means on the instrument panel for receiving the bayonet locking means of the sensor.

5. The sensor of claim 4, further comprising a spring in the instrument panel for locking the sensor in position in the instrument panel.

6. The sensor of claim 3, wherein the sensor is comprised of two parts arranged generally at right angles to each other, the first part having a free end with the upper surface of the measuring head thereon and the free end extending up from the vehicle instrument panel, and the second part extending off at a right angle from the first part and below the top of the instrument panel, the second part including the means for connection between the solar cells and the control unit.

7. The sensor of claim 1, wherein the dome is comprised of colored acrylic plastic material.

8. The measuring head of claim 1, wherein the measuring head has an upper plane surface on which the first solar cell is positioned.

9. The sensor of claim 8, wherein the measuring head had four side surfaces, each of the side surfaces intersects the upper plane surface at a right angle, the side surfaces being paired with the two surfaces of each pair being parallel, and each side surface forming a right angle with the adjacent side surfaces;
a respective one of the solar cells being on each of the side surfaces and on the upper surface; and the dome being over all of the solar cells.

10. The sensor of claim 9, wherein the measuring head is oriented so that with the instrument panel fastened in the vehicle, one pair of the side surfaces are arranged parallel to the longitudinal direction of the vehicle.

11. The sensor of claim 1, wherein the measuring head has four side surfaces which intersect the upper surface, the four side surfaces being in two parallel pairs, and each side surface is at a right angle to the adjacent side surfaces;
a respective one of the solar cells being located on each of the side surfaces and on the upper surface; and the dome being over all of the solar cells.

12. The sensor of claim 11, wherein the measuring head is oriented so that with the instrument panel fastened in the vehicle, one pair of the side surfaces are arranged parallel to the longitudinal direction of the vehicle.

13. The sensor of claim 1, wherein the measuring head has side surfaces which intersect the upper surface;
a respective one of the solar cells being located on each of the side surfaces and on the upper surface; and the dome being over all of the solar cells.

14. The sensor of claim 1, wherein there are four of the solar cells on the upper surface of the measuring head, the four solar cells each having a respective corner and the four solar cell corners meeting;
a shadow element positioned at the upper surface of the measuring head for producing a shadow image across at least some of the solar cells, the shadow element being positioned so that the shadow image cast by the shadow element varies with the position of the sun relative to the sensor.

15. The sensor of claim 1, wherein there are a plurality of the solar cells on the upper surface; the solar cells each having a respective corner and the plurality of solar cell corners meeting;
a shadow element positioned at the upper surface of the measuring head for producing a shadow image across at least some of the solar cells, the shadow element being positioned so that the shadow image cast by the shadow element varies with the position of the sun relative to the sensor.

16. The sensor of claim 15, wherein the shadow element comprises a non-transparent surface disposed above the solar cells.

17. The sensor of claim 16, wherein the non-transparent surface area is on the dome.

18. The sensor of claim 15, wherein the shadow element comprises walls projecting up from and located between neighboring solar cells.

19. The sensor of claim 10, wherein the attachment elements of the sensor comprise bayonet locking means on the sensor and cooperating bayonet locking and receiving means on the instrument panel for receiving the bayonet locking means of the sensor.

* * * * *